United States Patent
Park et al.

(10) Patent No.: US 11,173,330 B2
(45) Date of Patent: Nov. 16, 2021

(54) COMPRESSED AIR FOAM MIXING APPARATUS

(71) Applicant: MTK FIRE PROTECTION SYSTEMS, Seongnam-si (KR)

(72) Inventors: Kyung-Hwan Park, Yongin-si (KR); Da-Un Jeong, Gwangju-si (KR)

(73) Assignee: MTK FIRE PROTECTION SYSTEMS, Seongnam-si (KR)

( * ) Notice: Subject to any disclaimer, the term of this patent is extended or adjusted under 35 U.S.C. 154(b) by 224 days.

(21) Appl. No.: 16/085,916

(22) PCT Filed: Mar. 17, 2017

(86) PCT No.: PCT/KR2017/002905
§ 371 (c)(1),
(2) Date: Sep. 17, 2018

(87) PCT Pub. No.: WO2017/160120
PCT Pub. Date: Sep. 21, 2017

(65) Prior Publication Data
US 2019/0091499 A1    Mar. 28, 2019

(30) Foreign Application Priority Data

Mar. 17, 2016    (KR) .................. 10-2016-0032005

(51) Int. Cl.
*A62C 5/02*     (2006.01)
*B01F 15/04*    (2006.01)
(Continued)

(52) U.S. Cl.
CPC .............. *A62C 5/024* (2013.01); *A62C 31/12* (2013.01); *A62C 99/0036* (2013.01); *B01F 3/04* (2013.01); *B01F 15/04* (2013.01)

(58) Field of Classification Search
CPC ...... A62C 5/024; A62C 31/12; A62C 99/0036; B01F 15/04; B01F 3/04; B01F 15/0416; B01F 3/04446; G05D 11/131
See application file for complete search history.

(56) References Cited

U.S. PATENT DOCUMENTS 3,607,779 A * 9/1971 King .................. F04D 25/04
                                                           261/24
3,780,812 A * 12/1973 Lambert ............. A62C 3/0207
                                                           169/15
(Continued)

FOREIGN PATENT DOCUMENTS

JP      10-286323 A    10/1998
KR    20-0378222 Y1    3/2005
(Continued)

OTHER PUBLICATIONS

International Search Report for PCT/KR2017/002905 dated Jun. 5, 2017, citing the above reference(s).

*Primary Examiner* — Stephen Hobson
(74) *Attorney, Agent, or Firm* — Hauptman Ham, LLP

(57) ABSTRACT

This application with regard to an apparatus of mixing a compressed air foam is disclosed. The disclosed application includes a first mixing unit that receives fire water and an undiluted foam solution, and adjusts an inflow of the undiluted foam solution so that a supply amount of the undiluted foam solution is adjusted in proportion to a supply amount of the fire water, and mixes the received fire water and undiluted foam solution to produce a foam aqueous solution; and a second mixing unit that mixes a compressed gas with a foam aqueous solution produced in the first mixing unit to produce a compressed air foam.

6 Claims, 4 Drawing Sheets

(51) Int. Cl.
*B01F 3/04* (2006.01)
*A62C 31/12* (2006.01)
*A62C 99/00* (2010.01)

(56) References Cited

U.S. PATENT DOCUMENTS

| | | | | |
|---|---|---|---|---|
| 5,145,014 | A * | 9/1992 | Eberhardt | A62C 5/02 169/13 |
| 5,255,747 | A * | 10/1993 | Teske | A62C 5/02 169/15 |
| 6,109,359 | A * | 8/2000 | Ballard | A62C 5/02 169/14 |
| 6,276,459 | B1 * | 8/2001 | Herrick | A62C 5/02 169/14 |
| 6,733,004 | B2 * | 5/2004 | Crawley | A62C 5/02 169/14 |
| 6,991,041 | B2 * | 1/2006 | Laskaris | A62C 5/02 169/13 |
| 7,703,705 | B2 * | 4/2010 | Ganzer | B29C 44/3446 239/398 |
| 7,997,348 | B2 * | 8/2011 | Hosfield | A62C 5/02 169/14 |
| 8,307,907 | B2 * | 11/2012 | Laskaris | A62C 5/02 169/44 |
| 8,613,325 | B2 * | 12/2013 | Guse | B01F 5/0406 169/44 |
| 8,789,614 | B2 * | 7/2014 | Hosfield | A62C 31/00 169/14 |
| 10,099,078 | B1 * | 10/2018 | Blanchat | A62C 31/12 |
| 10,286,237 | B2 * | 5/2019 | Laskaris | A62C 35/026 |
| 2010/0038101 | A1 * | 2/2010 | Terry | A62C 31/07 169/70 |
| 2010/0175897 | A1 * | 7/2010 | Crump | A62C 5/02 169/14 |
| 2010/0218957 | A1 * | 9/2010 | Duda | A62C 99/0072 169/14 |
| 2010/0236799 | A1 * | 9/2010 | Vetesnik | A62C 5/02 169/70 |
| 2015/0122514 | A1 * | 5/2015 | Wu | B62K 19/46 169/52 |
| 2016/0096053 | A1 * | 4/2016 | Beechy | A62C 37/36 169/46 |
| 2020/0215372 | A1 * | 7/2020 | LaVergne | A62D 1/0085 |
| 2021/0220686 | A1 * | 7/2021 | Lackore, Jr. | A62C 35/026 |

FOREIGN PATENT DOCUMENTS

| | | |
|---|---|---|
| KR | 10-2010-0104051 A | 9/2010 |
| KR | 10-1239749 B1 | 3/2013 |
| KR | 10-2013-0123701 A | 11/2013 |
| KR | 10-1334367 B1 | 11/2013 |

* cited by examiner

COMPRESSED AIR FOAM MIXING APPARATUS

TECHNICAL FIELD

This application relates to a compressed air foam mixing apparatus, and more particularly, to a compressed air foam mixing apparatus that is provided in a fire extinguishing facility to mix and produce a compressed air foam.

BACKGROUND ART

Generally, a fire extinguisher is used to prevent or suppress fire. Such a fire extinguisher is extinguished by using an effect of cooling or air prevention that a fire extinguishing agent has at an early step of the fire.

At this time, the fire extinguisher is classified into a foam fire extinguisher, a powder fire extinguisher, a halon fire extinguisher, a carbon dioxide fire extinguisher, etc., and they are used in accordance with each situation.

The fire in modern society has a tendency of complex fire that cannot be defined as A, B, and C class fire. As all home appliances and furniture in households are also made up of petrochemicals mainly, a fire extinguisher that forms a foam by a small amount of fire water is needed, such as a foam fire extinguisher, to counteract the fire.

A conventional foam fire extinguisher performs an extinguishment by smothering in a form that an aggregate of a fine foam formed by being foamed by air for a foam that water and a foam fire extinguishing agent are mixed in a predetermined ratio covers a surface of the combustibles to prevent air.

This foam fire extinguisher mainly has a form in which a foam aqueous solution that an undiluted foam solution and fire water are mixed in advance is stored. There has been a problem that it causes a short lifespan and increases a possibility of a deterioration of the foam aqueous solution.

Further, since the conventional foam fire extinguisher has a possibility of being released in a state in which a mixing ratio of the undiluted foam solution and the fire water is not proper, an effect of a fire extinguishing action may be reduced and a problem of increasing only a use amount may occur.

The background art of this application is disclosed in Korean Patent No. 10-1239749 (registered on Feb. 27, 2013, invention title: Portable Foam Apparatus for Fire Extinguishing).

DISCLOSURE

Technical Problem

It is an object of this application to provide a compressed air foam mixing apparatus capable of preventing a fire extinguishing action effect from being degraded due to a deterioration of a foam aqueous solution, and making an undiluted foam solution and fire water be mixed at an optimum ratio to improve an effect of a fire extinguishing action.

It is also an object of this application to provide a compressed air foam mixing apparatus capable of not only effectively adjusting a mixing ratio of the compressed air foam according to a type of fire, but also automatically mixing the undiluted foam solution and the fire water at an optimum mixing ratio.

Technical Solution

An apparatus of mixing a compressed air foam may include a first mixing unit that receives fire water and an undiluted foam solution and adjusts an inflow of the undiluted foam solution so that a supply amount of the undiluted foam solution is controlled in proportion to a supply amount of the fire water, and mixes the received fire water and undiluted foam solution to produce a foam aqueous solution; and a second mixing unit that mixes a compressed gas with a foam aqueous solution produced in the first mixing unit to produce a compressed air foam.

Further, it is preferable that the first mixing unit may include a fire water inflow portion in which fire water is flowed; a rotation portion that is rotated by fire water flowed in through the fire water inflow portion; a pump portion that is rotated by being interlocked with a rotation of the rotation portion and produces a suction force to suck an undiluted foam solution; an undiluted foam solution suction portion that the undiluted foam solution is sucked by a suction force generated by the pump portion; and a foam aqueous solution production portion that mixes fire water flowed in through the fire water inflow portion and an undiluted foam solution that is sucked through the undiluted foam solution suction portion to produce a foam aqueous solution.

Further, the pump portion may be connected to a rotation shaft of the rotation portion on the same axis and is rotated in proportion to the rotation of the rotation portion, and may generate a suction force to suck the undiluted foam solution in an amount in proportion to a flow rate of the fire water flowed in through the fire water inflow portion.

Further, the first mixing unit may further include an undiluted foam solution adjustment portion that adjusts a suction amount of the undiluted foam solution sucked through the undiluted foam solution suction portion.

Further, the second mixing unit may include a foam aqueous solution inflow portion in which the foam aqueous solution produced in the first mixing unit is flowed; a compressed gas inflow portion in which a compressed gas is flowed; and a compressed air foam production portion that mixes the compressed gas flowed in through the compressed gas inflow portion and a foam aqueous solution flowed in through the foam aqueous solution inflow portion to produce a compressed air foam.

Further, the second mixing unit may include a plurality of compressed gas inflow portions that have a different inflow rate of the compressed gas, respectively, and flow the compressed gas into the compressed air foam production portion, wherein the plurality of compressed gas inflow portions are provided at a different position from each other; and wherein the compressed gas supply portion that supplies the compressed gas is selectively connected to the plurality of compressed gas inflow portions to supply the compressed gas to the connected compressed gas inflow portion.

Further, the second mixing unit may further include an emergency supply portion that receives the foam aqueous solution through other path, not the first mixing unit, to flow a received foam aqueous solution into the compressed air foam production portion.

Advantageous Effects

According to the compressed air foam mixing apparatus of the this application, by automatically mixing the fire water and the undiluted foam solution, each being provided separately, at an optimum composition ratio and providing it, it is possible to not only prevent the fire extinguishing action from being degraded due to the deterioration of the foam aqueous solution, but also improve the effect of the fire extinguishing action by allowing the undiluted foam solution and the fire water to be mixed at the optimum ratio.

Further, since this application can conveniently adjust the composition ratio of the foam aqueous solution and the compressed gas as necessary while automatically mixing the undiluted foam solution and the fire water at the optimum mixing ratio, it is possible to effectively adjust the composition ratio of the compressed air foam according to the pattern of the fire to improve the effect of the fire extinguishing action.

spective view showing a second mixing unit in accordance with an exemplary embodiment of this application.

Figure 1:
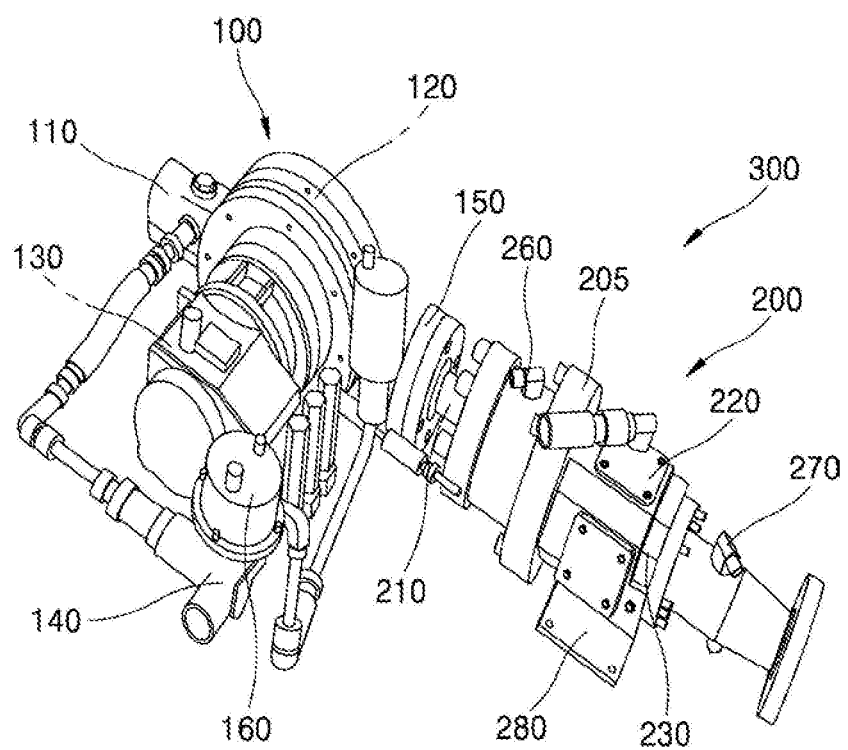
FIG. 1 is a front perspective view showing a compressed air foam mixing apparatus in accordance with an exemplary embodiment of this application.
Figure 2:
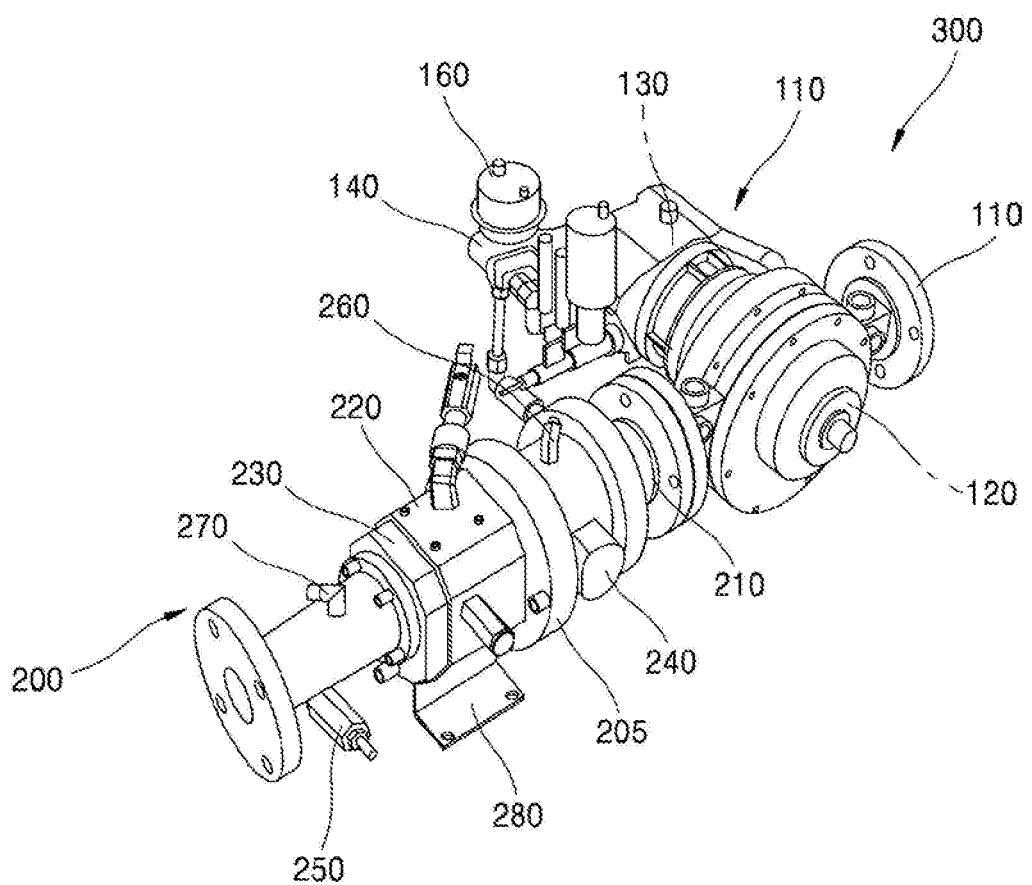
FIG. 2 is a rear perspective view showing a compressed air foam mixing apparatus in accordance with an exemplary embodiment of this application.
Figure 3:
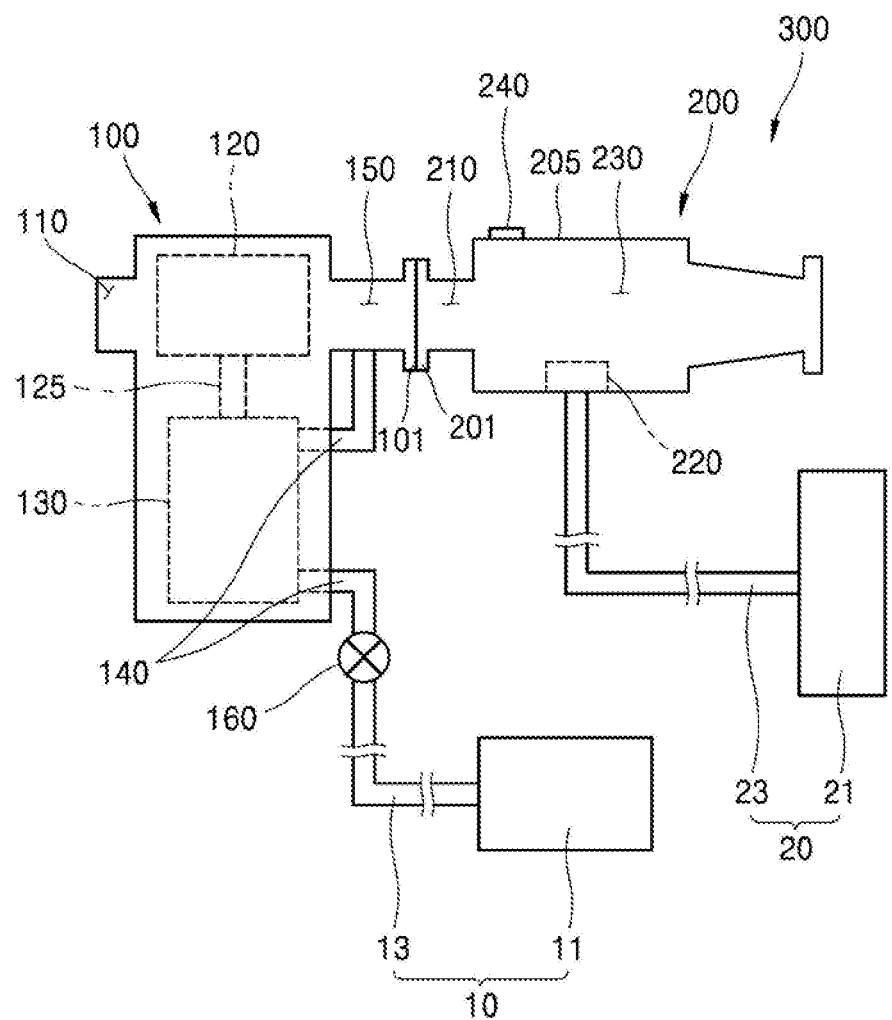
FIG. 3 is a configuration view schematically showing a configuration of a compressed air foam mixing apparatus in accordance with an exemplary embodiment of this application.

Referring to FIGS. 1 to 3, a compressed air foam mixing apparatus 300 in accordance with an exemplary embodiment of this application may include a first mixing unit 100 and a second mixing unit 200.

The first mixing unit 100 may be provided to produce a foam aqueous solution to mix fire water and an undiluted foam solution, and to provide a produced foam aqueous solution to the second mixing unit 200.

The first mixing unit 100 may receive the fire water and the undiluted foam solution and control an inflow of the undiluted foam solution so that a supply amount of the undiluted foam solution is controlled in proportion to a supply amount of the fire water, and mix the received fire water and undiluted foam solution to produce the foam aqueous solution.

A supply of the fire water to the first mixing unit 100 may be made by fire water that is supplied through a fire water supply source being flowed into an inside of the first mixing unit 100 through the fire water inflow portion 110 in a state in which a fire water supply source (not shown) and a fire water inflow portion 110 of the first mixing unit 100, which will be described later.

Further, a supply of the undiluted foam solution to the first mixing unit 100 can be made by the undiluted foam solution

| * Description of Symbols about the main parts in Figures * | |
|---|---|
| 10: Undiluted foam solution supply portion | 11: Solution tank |
| 13: Undiluted foam solution supply pipe | 20: Compressed gas supply portion |
| 21: Compressed gas tank | 23: Compressed gas supply pipe |
| 100: First mixing unit | 101, 201: Coupling portion |
| 110: Fire extinguishing inflow portion | 120: Rotation portion |
| 125: Rotation shaft | 130: Pump portion |
| 140: Undiluted foam solution suction portion | 150: Foam aqueous solution production portion |
| 160: Undiluted foam solution adjustment portion | 200: Second mixing unit |
| 205: Housing | 210: Foam aqueous solution inflow portion |
| 220: Compressed gas inflow portion | 230: Compressed air foam production portion |
| 240: Emergency supply portion | 250: Drain portion |
| 260: First pressure gauge installation portion | 270: Second pressure gauge installation portion |
| 280: Coupling base portion | 300: Compressed air foam mixing apparatus |

BEST MODE

Hereinafter, an embodiment of a compressed air foam mixing apparatus according to this application will be described with reference to the accompanying drawings. For convenience of explanation, the thicknesses of the lines and the sizes of the components shown in the drawings, etc., may be shown in an exaggerated form for convenience and clarity of explanation. Further, the terms described below are the terms that are defined in consideration of the functions of this application, which may vary depending on an intention or custom of a user and an operator. Therefore, the definition of these terms should be defined based on the contents throughout this specification.

Figure 4:
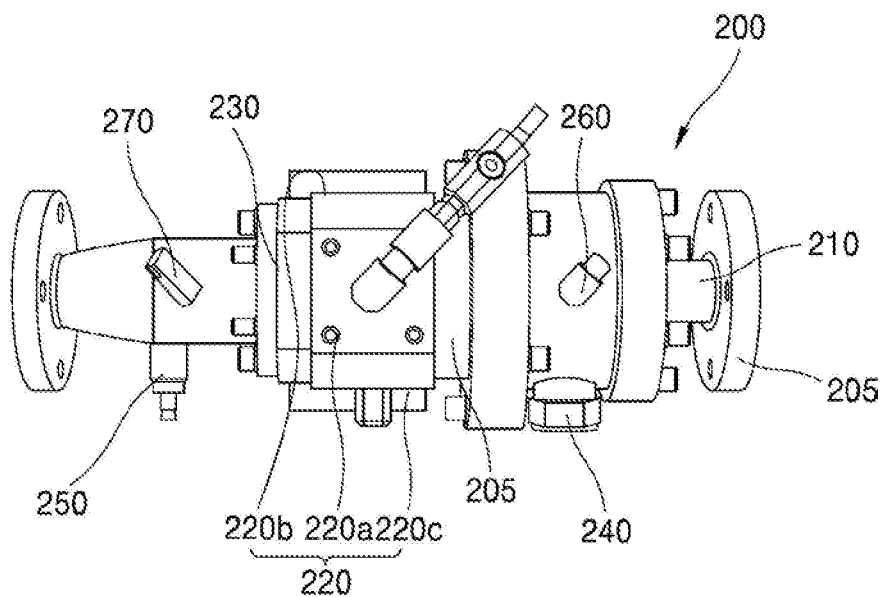
FIG. 4 is a plan view showing a second mixing unit in accordance with an exemplary embodiment of this application.
Figure 5:
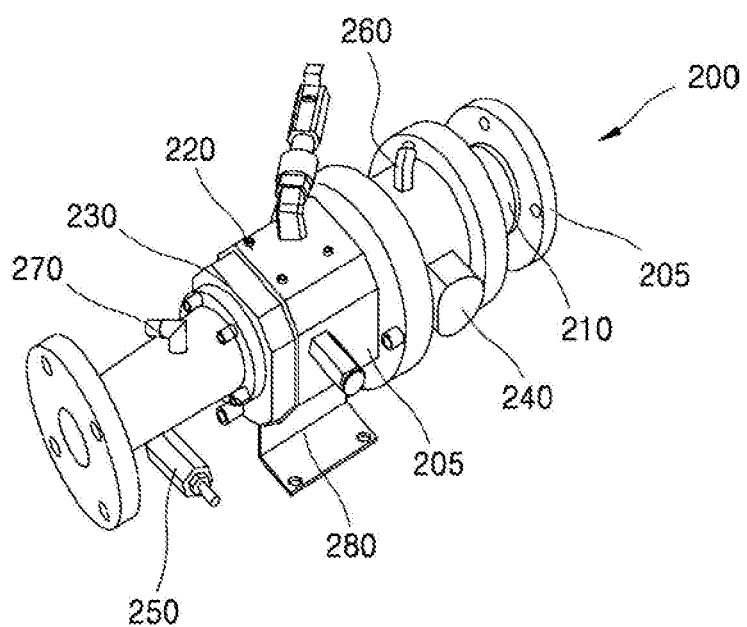
FIG. 5 is a rear perspective view showing a second mixing unit in accordance with an exemplary embodiment of this application.

FIG. 1 is a front perspective view showing a compressed air foam mixing apparatus in accordance with an exemplary embodiment of this application, and FIG. 2 is a rear perspective view showing a compressed air foam mixing apparatus in accordance with an exemplary embodiment of this application, and FIG. 3 is a cross-sectional view schematically showing a structure of a foam aqueous solution production portion. Further, FIG. 4 is a plan view showing a second mixing unit in accordance with an exemplary embodiment of this application, and FIG. 5 is a rear persupplied through the undiluted foam solution supply portion 100 being sucked to an inside of the first mixing unit 100 through the undiluted foam solution suction portion 140 in a state in which an undiluted foam solution supply portion 10 and an undiluted foam solution suction portion 140 of the first mixing unit 100, which will be described later.

According to the present embodiment, the first mixing unit 100 may include a fire water inflow portion 110, a rotation portion 120, a pump portion 130, an undiluted foam solution suction portion 140, and a foam aqueous solution production portion 150.

The fire water inflow portion 110 may be provided at an entrance side of the first mixing unit 100 connected to the fire water inflow portion 110.

The fire water inflow portion 110 may include a connecting portion (a reference numeral is omitted) that is provided to be exposed outside so that a connection with a fire water supply pipe (not shown) extending from the fire water supply source is made, and an inflow portion (not shown) that is formed to be penetrated at the entrance side of the first mixing unit 100 so as to form a flow path connected with the fire water supply pipe coupled to the connecting portion.

The rotation portion 120 may be provided inside the first mixing unit 100. In this embodiment, the rotation portion 120 may be exemplified as being provided in a form of a water wheel that is rotatably installed inside the first mixing unit 100.

The rotation portion 120 may be provided to be rotated by a flow of the fire water flowed in through the fire water inflow portion 110.

The pump portion 130 may be provided inside the first mixing unit 100 together with the rotation portion 120. The pump unit 130 may include a pump that sucks an undiluted foam solution through a suction side and discharges an undiluted foam solution through an exit side by using a power obtained from a rotational force.

According to the present embodiment, the pump portion 130 may generate a suction force for sucking the undiluted foam solution by using the power obtained by being rotated by being interlocked with a rotation of the rotation portion 120.

That is, the pump portion 130 may be connected to the rotation shaft 125 of the rotation portion 120 on the same axis, and rotated in proportion to the rotation of the rotation portion 120, thereby generating the suction force for sucking the undiluted foam solution in an amount in proportion to a flow amount of the fire water flowed through the fire water inflow portion 110.

As described above, by an interlocking rotation structure between the rotation portion 120 and the pump portion 130, a suction amount of the undiluted foam solution can be automatically adjusted in proportion to the inflow amount of the fire water, and accordingly, a supply of the fire water and the undiluted foam solution can be made while a component ratio of the fire water and the undiluted foam solution provided to produce the foam aqueous solution is automatically adjusted to the specified composition ratio.

The undiluted foam solution suction portion 140 may be provided as a passage through which the undiluted foam solution is sucked by the suction force generated by the pump portion 130.

Such an undiluted foam solution suction portion 140 may include the connecting portion (the reference numeral is omitted) provided to be exposed outside so that a connection with an undiluted foam solution supply pipe 13 extending from a solution tank 11 of the undiluted foam solution supply portion 10 is made and a suction portion (not shown) that is formed to be penetrated so as to foam the flow path connected with the undiluted foam solution supply pipe 13 coupled to the connecting portion.

The undiluted foam solution sucked from the undiluted foam solution supply portion 10 through the undiluted foam solution suction portion 140 may be transferred to the foam aqueous solution production portion 150 and mixed with the fire water in the foam aqueous solution production portion 150.

Further, the first mixing unit 100 of the present embodiment may further include an undiluted foam solution adjustment portion 160 that adjusts the suction amount of the undiluted foam solution sucked through the undiluted foam solution suction portion 140.

In the present embodiment, the undiluted foam solution adjustment portion 160 may be exemplified as including a control valve that is installed on an undiluted foam solution suction portion 140 and operated to adjust a suction amount of an undiluted foam solution that is sucked through the undiluted foam solution suction portion 140.

An operation of this undiluted foam solution adjustment portion 160 can be controlled by an operation control of a control apparatus (not shown) that is provided to control an operation of the compressed air foam mixing apparatus 300 and adjust the suction amount of the undiluted foam solution that is sucked through the undiluted foam solution suction portion 140 so that the mixing ratio of the undiluted foam solution that is mixed with the fire water in the foam aqueous solution production portion is adjusted.

As an example, the undiluted foam solution adjustment portion 160 may be operated so that the mixing ration of the undiluted foam solution that is mixed with the fire water in the foam aqueous solution production portion is adjusted to any one of 1%, 2%, and 6% according to a pattern of fire, and may be operated to be adjusted to a range of 0.1 to 1% or a range of 3 to 6% according to an operation characteristic or a capacity of a pump.

The foam aqueous solution production portion 150 may mix the fire water flowed in through the fire water inflow portion 110 and the undiluted foam solution sucked through the undiluted foam water suction portion 140 to produce the foam aqueous solution.

In this foam aqueous solution production portion 150, a flow of the undiluted foam solution that is sucked through the undiluted foam solution suction portion 140 may be joined to a flow of the fire water that is flowed in through the fire water inflow portion 110 so that the mixing of the fire water and the undiluted fire solution is made, and accordingly, the foam aqueous solution is produced.

As described above, the foam aqueous solution produced in the aqueous solution production portion 150 may be transferred and supplied to the second mixing unit 200 along the flow of the fire water flowed in through the fire water inflow portion 110.

Referring to FIGS. 3 and 4, a second mixing unit 200 may be provided to mix a compressed gas with a foam aqueous solution produced in a first mixing unit 100 to produce a compressed air foam.

Preferably, the second mixing unit 200 may be separably coupled to the first mixing unit 100. In this embodiment, the coupling portions 101 and 201 in a flange form may be provided at a coupling portion of the first mixing unit 100 and the second mixing unit 200, i.e., an exit side of the first mixing unit 100 and an entrance side of the second mixing unit 200, and it may be exemplified that the separable coupling between the first mixing unit 100 and the second mixing unit 200 is made through a separable coupling between these two coupling portions 101 and 201.

The second mixing unit 200 provided as described above may include a foam aqueous solution inflow portion 210, a compressed gas inflow portion 220, and a compressed air foam production portion 230.

The foam aqueous solution inflow portion 210 may be provided at an entrance side of the second mixing unit 200 connected to a foam aqueous solution production portion 150 of the first mixing unit 100.

A foam aqueous solution that is produced in the foam aqueous solution production portion 150 and transferred may be transferred inside the second mixing unit 200 through a flow path formed inside the foam aqueous solution inflow portion 210 to be connected with the foam aqueous solution production portion 150, and a foam aqueous solution transferred to the inside of the second mixing unit 200 as described above may be transferred to the compressed air foam production portion 230 side to be mixed with the compressed gas in the compressed gas foam production portion 230.

The compressed gas inflow portion 220 may be provided as a passage through which the compressed gas supplied from a compressed gas supply portion 20 is flowed in. Here, the compressed gas supply portion 20 may include a compressed gas tank 21 that stores and supplies a compressed air, nitrogen, or a compressed gas provided a mixture of a compressed air and nitrogen, and a compressed gas supply pipe 23 extending from the compressed gas tank 21 and connected with the compressed gas inflow portion 220.

According to the present embodiment, a housing 205 that forms an outer shape of the second mixing unit 200 may be provided in a form of a polyhedron having a plurality of sides.

The second mixing unit 200 may include a plurality of compressed gas inflow portions 220 that have the different inflow rates of the compressed gas, respectively and flows the compressed gas into the compressed air foam production portion 230.

At this time, the respective compressed gas inflow portions 220 may be provided to be disposed at different positions from each other, that is, on different sides of the housing 205.

In this embodiment, it may be illustrated that the housing 205 may be provided in a form of a polyhedron having four sides, and a compressed gas inflow portion 220 may be provided at three sides of four sides of the housing 205, respectively.

Each of the compressed gas inflow portion 220 disposed on the different sides of the housing 205 from each other may have a different flow rate of the compressed gas, respectively, and may be provided to flow the compressed gas into the compressed air foam generation portion 230.

For example, a compressed gas inflow portion 220a disposed at any one side of the housing 205 may be provided to flow in a compressed gas in a flow rate so that the ratio of a foam aqueous solution and a compressed gas flowed into a compressed air foam production portion 230 is 1:4, and a compressed gas inflow portion 220b that is disposed at the other side may be provided to flow in a compressed gas in a flow rate that the ratio of a foam aqueous solution and a compressed gas is 1:7, and the compressed gas inflow portion 220c that is disposed other sides may be provided to flow in a compressed gas in a flow rate that the ratio of a foam aqueous solution and a compressed gas is 1:10.

A plurality of compressed gas supply inflow portions 220 provided as described above may be selectively connected to a compressed gas supply portion 20, more specifically, a compressed gas supply pipe 23 to supply the compressed gas to the connected compressed gas inflow portion 220 at high pressure.

That is, depending on which of the plurality of compressed gas inflow portions 220 are connected to the compressed gas supply portion 20, the inflow flow rate of the compressed gas flowed into the compressed air foam generation portion 230 can be adjusted, and accordingly, the ratio of the compressed gas and the foam aqueous solution mixed in the compressed air foam production portion 230 can be appropriately adjusted according to needs.

* The compressed air foam production portion 230 may produce the compressed air by mixing the aqueous solution flowed in through the aqueous solution inflow portion 210 and the compressed gas flowed in through the compressed gas inflow portion 220.

In this compressed air foam production portion 230, a flow of the compressed gas flowed in at a high pressure through the compressed gas inflow portion 220 may join a flow of the foam aqueous solution flowed in through the foam aqueous solution inflow portion 210 so that a mixing of the foam aqueous solution and the compressed gas is made, and accordingly, a compressed air foam is produced.

As described above, the compressed air foam produced in the compressed air production portion 230 may be pressurized and transferred to an exit side of the second mixing unit 200 along the flow of the compressed gas flowed in through the compressed gas inflow portion 220 at a high pressure, and may be injected at high pressure through an ejector (not shown) connected to the exit side of the second mixing unit 200.

Meanwhile, the second mixing unit 200 of the present embodiment may further include an emergency supply portion 240, as shown in FIGS. 3 to 5.

The emergency supply portion 240 may be provided to receive the foam aqueous solution through other path, not a first mixing unit 100, and flow it into a compressed air foam production portion 230, and provided at an entrance side of a second mixing unit 200 and provided to be disposed at a position different from a foam aqueous solution inflow portion 210.

The emergency supply portion 240 may be provided as an emergency connector that is provided to receive the foam aqueous solution through other path, not the first mixing unit 100, when a supply of the foam aqueous solution through the first mixing unit 100 is not smoothly made.

Further, the second mixing unit 200 of the present embodiment may further include a drain portion 250, a first pressure gauge installation portion 260, and a second pressure gauge installation portion 270.

The drain portion 250 may be provided as a discharge portion to discharge a foam aqueous solution or a compressed air foam that is remained in a second mixing unit 200 so as to prevent freezing due to remained foam aqueous solution or compressed air foam.

The first pressure gauge installation portion 260 may be provided to install a pressure gauge for measuring an inflow pressure of a foam aqueous solution flowed in through a foam aqueous solution inflow portion 210.

The inflow pressure of the foam aqueous solution can be measured by using the pressure gauge installed in the first pressure gauge installation portion 260. An inflow pressure measured in this way may be utilized as information to adjust an operation of a first mixing unit 100 so that the inflow pressure of the foam aqueous solution flowed in through the foam aqueous solution inflow portion 210 is 4 to 7 bar range, i.e., information to adjust a supply amount of fire water flowed into the first mixing unit 100.

The second pressure gauge installation portion 270 may be provided to install a pressure gauge to measure a discharge pressure of a compressed air foam produced in a second mixing unit 200 and discharged.

The discharge pressure of the compressed air foam can be measured by using a pressure gauge installed in the second pressure gauge installation portion 270. A discharge pressure measured in this way may be utilized as information to adjust a discharge pressure of a compressed air foam discharged by the second mixing unit 200, i.e., information to adjust a supply amount of fire water that is flowed into a first mixing unit 100, a flow rate and an inflow speed of a compressed gas that is flowed into the second mixing unit 200.

A compressed air foam mixing apparatus 300 of the present embodiment including the above-described configurations can be installed as a part of a fire extinguishing system mounted on a fire truck used for fire suppression.

For example, the compressed air foam mixing apparatus 300 of the present embodiment may be installed in a fire truck provided with a fire water supply portion, an undiluted foam solution supply portion 10, and a compressed gas supply portion 20 to form a part of a fire extinguishing facility mounted on the fire truck.

The compressed air foam mixing apparatus 300 can be installed on the fire truck by the medium of a coupling between a coupling base portion 280 and the fire truck, and may be connected with the fire water supply portion 10 and the compressed gas supply portion 20, and may receive fire water, an undiluted foam solution, and a compressed gas from the fire water supply portion, the undiluted foam solution supply portion 10, and the compressed gas supply portion 20, and may mix the received fire water, undiluted foam solution, and compressed gas to produce a compressed air foam.

The compressed air foam mixing apparatus 300 may be connected with an injection nozzle (not shown) to inject a compressed air foam that an exit side thereof is produced. As a result, the compressed air foam produced by the compressed air foam mixing apparatus 300 may be injected at a purpose position through the injection nozzle so that it is possible to perform a fire extinguishing action.

Hereinafter, an action and an effect of the compressed air foam mixing apparatus 300 in accordance with the present embodiment will be described.

According to the compressed air foam mixing apparatus 300 in accordance with the present embodiment, in a first mixing unit 100, an action that mixes fire water and an undiluted foam solution to produce a foam aqueous solution may be made, and in the second mixing unit 200, an action that mixes a compressed gas into a foam aqueous solution produced in the first mixing unit 100, and produces a compressed air foam to inject a produced compressed air foam through a spinning apparatus.

In the first mixing unit 100, the inflow of the undiluted foam solution may be adjusted so that the supply amount of the undiluted foam solution is controlled in proportion to the supply amount of the fire water.

Accordingly, the rotation of the rotation portion 120 may be made by the flow of the fire water flowed in through the fire water inflow portion 110, and the pump portion 130 may be connected with the rotation shaft 125 of the rotation portion 120 on the same axis and rotated in proportion to the rotation of the rotation portion 120, thereby generating the suction force to suck the undiluted foam solution in the amount in proportion to the flow rate of the fire water inflowing through the fire water inflow portion 120.

By the interlocking rotation structure between the rotation portion 120 and the pump portion 130, the suction amount of the undiluted foam solution can be automatically adjusted in proportion to the inflow amount of the fire water, and accordingly, as the composition ratio in which the composition ratio of the fire water and the undiluted foam solution supplied to produce the foam aqueous solution is automatically adjusted to a specified composition ratio, the supply of the fire water and the foam aqueous solution can be made.

As described above, the fire water and undiluted foam solution supplied while the composition ratio is automatically adjusted are mixed at an optimum composition ratio specified in the foam aqueous solution production portion 150 to produce the foam aqueous solution, and the produced foam aqueous solution may be supplied to the second mixing unit 200.

As the first mixing unit 100 that produces and supplies the foam aqueous solution as described above does not supply the foam aqueous solution in which the fire water and the undiluted foam solution are stored in a premixed state, and automatically mixes the fire water and the undiluted foam solution, each being provided separately, at the optimum composition ratio to produce the foam aqueous solution, it may be possible to prevent a fire extinguishing action effect from being degraded due to a deterioration of the foam aqueous solution, and make the foam aqueous solution and the fire water be mixed at an optimum ratio so that the effect of the fire extinguishing action is improved.

The foam aqueous solution supplied to the second mixing unit 200 may be mixed with the compressed gas in the second mixing unit 200 and may be produced as a compressed air foam.

At this time, the compressed air foams having different composition ratios, respectively, may be produced depending on the flow rate of the compressed gas flowed in through the compressed gas inflow portion 220.

According to the present embodiment, the respective compressed gas inflow portion 220 positioned on the different sides of the housing 205 respectively may have different flow rates of the compressed gas, respectively, and may be provided to flow the compressed gas into the compressed air foam production portion 230.

Further, the plurality of compressed gas inflow portions 220 that are provided as described above are selectively connected with the compressed gas supply portion 20, more specifically with the compressed gas supply pipe 23 to supply the compressed gas to the compressed gas inflow portion 220 at high pressure.

That is, depending on which of the plurality of compressed gas inflow portions 220 are connected to the compressed gas supply portion 20, an inflow flow rate of the compressed gas flowed into the compressed air foam production portion 230 can be adjusted, and accordingly, the ratio of the foam aqueous solution and the compressed gas mixed in the compression air foam production portion 230 can be appropriately adjusted according to needs.

The compressed air foam produced in the compressed air production portion 230 are pressurized and transferred to the exit side of the second mixing unit 200 along the flow of the compressed gas flowed in at a high pressure through the compressed gas inflow portion 220, and may be injected at high pressure through the spinning equipment (not shown) connected to the exit side of the second mixing unit 200.

In the compressed air foam mixing apparatus 300 according to the present embodiment as described above, by automatically mixing and supplying the fire water and the undiluted foam solution, each being supplied separately, in the optimum composition ratio, it is possible to prevent the fire extinguishing action effect from being degraded due to the deterioration of the foam aqueous solution and to improve the effect of the fire extinguishing action for the undiluted foam solution and the fire water being mixed at the optimum ratio.

In addition, since the compressed air foam mixing apparatus 300 of the present embodiment can conveniently adjust the composition ratio of the foam aqueous solution and the compressed gas, if necessary, while automatically mixing the undiluted foam solution and the fire water in an optimum mixing ratio, it may be possible to effectively adjust the composition ratio of the compressed air foam according to a pattern of fire to improve the effect of the fire extinguishing action.

While this application has been described with reference to the embodiments shown in the drawings, it is to be understood that it is merely illustrative, and various modifications and other equivalent embodiments can be made therefrom for the skilled person in the art to which this application pertains. Accordingly, the true technical protection scope of this application should be defined by the following claims.

The invention claimed is:

1. A compressed air foam mixing apparatus, the apparatus comprising:
    a first mixing unit configured to
        receive fire water and an undiluted foam solution,
        adjust an inflow of the undiluted foam solution so that a supply amount of the undiluted foam solution is controlled in proportion to a supply amount of the fire water, and
        mix the fire water and the undiluted foam solution to produce a foam aqueous solution; and
    a second mixing unit configured to mix a compressed gas with the foam aqueous solution produced in the first mixing unit to produce a compressed air foam,
    wherein
    the first mixing unit is configured to adjust, based on a pattern of fire, a suction amount of the undiluted foam solution sucked through an undiluted foam solution suction portion included in the first mixing unit, and
    the second mixing unit further comprises an emergency supply portion that receives the foam aqueous solution through another path, not the first mixing unit, to flow the foam aqueous solution into a compressed air foam production portion.

2. The compressed air foam mixing apparatus of claim 1, wherein the first mixing unit comprises:
    a fire water inflow portion in which the fire water is flowed;
    a rotation portion that is rotated by the fire water flowed in through the fire water inflow portion;
    a pump portion that is rotated by being interlocked with a rotation of the rotation portion and produces a suction force to suck the undiluted foam solution;
    the undiluted foam solution suction portion that the undiluted foam solution is sucked by the suction force generated by the pump portion; and
    a foam aqueous solution production portion that mixes the fire water flowed in through the fire water inflow portion and the undiluted foam solution that is sucked through the undiluted foam solution suction portion to produce the foam aqueous solution.

3. The compressed air foam mixing apparatus of claim 2, wherein the pump portion is connected to a rotation shaft of the rotation portion on a same axis, and is rotated in proportion to the rotation of the rotation portion, and generates the suction force to suck the undiluted foam solution in an amount in proportion to a flow rate of the fire water flowed in through the fire water inflow portion.

4. The compressed air foam mixing apparatus of claim 2, wherein the first mixing unit further comprises an undiluted foam solution adjustment portion to adjust the suction amount of the undiluted foam solution sucked through the undiluted foam solution suction portion.

5. The compressed air foam mixing apparatus of claim 1, wherein the second mixing unit comprises:
    a foam aqueous solution inflow portion in which the foam aqueous solution produced in the first mixing unit is flowed;
    a compressed gas inflow portion in which the compressed gas is flowed; and
    the compressed air foam production portion that mixes the compressed gas flowed in through the compressed gas inflow portion and the foam aqueous solution flowed in through the foam aqueous solution inflow portion to produce the compressed air foam.

6. The compressed air foam mixing apparatus of claim 5, wherein the second mixing unit comprises a plurality of compressed gas inflow portions that have a different inflow rate of the compressed gas, respectively, and flow the compressed gas into the compressed air foam production portion,
    wherein each of the plurality of compressed gas inflow portions is provided at a different position from each other, and
    wherein the compressed gas supply portion that supplies the compressed gas is selectively connected to the plurality of compressed gas inflow portions to supply the compressed gas to the connected compressed gas inflow portion.

* * * * *